United States Patent
Hoang et al.

(10) Patent No.: US 9,951,504 B2
(45) Date of Patent: Apr. 24, 2018

(54) APPARATUS FOR CONTROLLING A TOILET SYSTEM

(71) Applicant: B/E AEROSPACE, INC., Wellington, FL (US)

(72) Inventors: Thao Hoang, Rockford, IL (US); Bradley J. Buniak, Schaumburg, IL (US); Stephen M. Niznik, Rockford, IL (US); William Pedersen, Rockford, IL (US); Mark A. Pondelick, Rockton, IL (US)

(73) Assignee: B/E Aerospace, Inc., Winston Salem, NC (US)

(*) Notice: Subject to any disclaimer, the term of this patent is extended or adjusted under 35 U.S.C. 154(b) by 103 days.

(21) Appl. No.: 15/084,257

(22) Filed: Mar. 29, 2016

(65) Prior Publication Data

US 2016/0289938 A1   Oct. 6, 2016

Related U.S. Application Data

(60) Provisional application No. 62/140,260, filed on Mar. 30, 2015.

(51) Int. Cl.
*E03D 11/10* (2006.01)
*E03D 9/00* (2006.01)
(Continued)

(52) U.S. Cl.
CPC .......... *E03D 9/00* (2013.01); *B64D 11/02* (2013.01); *E03D 5/012* (2013.01); *E03D 5/10* (2013.01);
(Continued)

(58) Field of Classification Search
CPC ........................................................ E03D 9/00
(Continued)

(56) References Cited

U.S. PATENT DOCUMENTS

| | | |
|---|---|---|
| 2,680,714 A | 6/1954 | Carlsson et al. |
| 2,708,033 A | 5/1955 | Thomas |

(Continued)

FOREIGN PATENT DOCUMENTS

| | | |
|---|---|---|
| EP | 1818462 A1 | 8/2007 |
| EP | 2050882 B1 | 9/2015 |
| WO | 2008010570 A1 | 1/2008 |

OTHER PUBLICATIONS

International Search Report and Written Opinion issued in related application PCT/US2016/024936, dated Jun. 16, 2016, 11 pages.

(Continued)

*Primary Examiner* — Christine Skubinna
(74) *Attorney, Agent, or Firm* — Donna P. Suchy

(57) ABSTRACT

A toilet system configured for operation on-board an aircraft includes, according to an implementation, a toilet bowl, a left side support bracket supporting the toilet bowl, a right side support bracket supporting the toilet bowl, a control box including a first set of pins, and a harness connector configured to electrically couple the toilet to the aircraft. The harness connector includes a set of pins, where the first set of pins of the control box are configured to be connected to the set of pins included in the harness connector, and the control box is configured to determine a platform of the aircraft based on the presence or absence of a pin in the set of pins included in the harness connector.

11 Claims, 3 Drawing Sheets

(51) Int. Cl.
*B64D 11/02* (2006.01)
*E03D 11/13* (2006.01)
*E03D 5/10* (2006.01)
*E03D 5/012* (2006.01)
*F16K 3/04* (2006.01)
*F16K 31/04* (2006.01)
*F16K 31/46* (2006.01)
*E03D 11/16* (2006.01)
*E03F 1/00* (2006.01)

(52) U.S. Cl.
CPC ............ *E03D 11/13* (2013.01); *E03D 11/135* (2013.01); *E03D 11/16* (2013.01); *E03F 1/006* (2013.01); *F16K 3/04* (2013.01); *F16K 31/047* (2013.01); *F16K 31/465* (2013.01)

(58) Field of Classification Search
USPC .................................................. 4/252.1, 434
See application file for complete search history.

(56) References Cited

U.S. PATENT DOCUMENTS

| | | | |
|---|---|---|---|
| 2,878,829 A | 3/1959 | Folmsbee |
| 3,411,162 A | 11/1968 | Palmer |
| 3,447,777 A | 6/1969 | Carlson |
| 3,510,099 A | 5/1970 | Crump |
| 3,616,617 A | 11/1971 | De Groote |
| 3,719,957 A | 3/1973 | Riedel |
| 3,722,850 A | 3/1973 | Kemper |
| 3,835,479 A | 9/1974 | Milette et al. |
| 3,902,876 A | 9/1975 | Moen et al. |
| 3,939,500 A | 2/1976 | Miller et al. |
| 3,995,328 A | 12/1976 | Carolan et al. |
| 4,041,554 A | 8/1977 | Gregory et al. |
| 4,237,934 A | 12/1980 | Gregory et al. |
| 4,289,611 A | 9/1981 | Brockmann |
| 4,376,314 A | 3/1983 | Iwans |
| 4,438,781 A | 3/1984 | Brenholt |
| 4,469,497 A | 9/1984 | Linhardt |
| 4,511,117 A | 4/1985 | Soderstrom |
| 4,546,502 A | 10/1985 | Lew |
| 4,601,210 A | 7/1986 | Brown |
| 4,612,120 A | 9/1986 | Box |
| 4,635,901 A | 1/1987 | Pond |
| 4,713,847 A | 12/1987 | Oldfelt et al. |
| 4,783,859 A | 11/1988 | Rozenblatt et al. |
| 4,811,754 A | 3/1989 | Wilhelm |
| 4,968,325 A | 11/1990 | Black et al. |
| 5,007,117 A | 4/1991 | Oldfelt et al. |
| 5,035,011 A | 7/1991 | Rozenblatt et al. |
| 5,048,130 A | 9/1991 | Brotman et al. |
| 5,065,786 A | 11/1991 | Rozenblatt |
| 5,099,867 A | 3/1992 | Emery |
| 5,142,712 A | 9/1992 | Hennessy |
| 5,231,706 A | 8/1993 | Kendall |
| 5,271,105 A | 12/1993 | Tyler |
| 5,317,763 A | 6/1994 | Frank et al. |
| 5,326,069 A | 7/1994 | Clear et al. |
| 5,344,085 A | 9/1994 | Hofseth |
| 5,372,710 A | 12/1994 | Frank |
| 5,464,191 A | 11/1995 | Shenk |
| 5,515,554 A | 5/1996 | Clear et al. |
| 5,535,770 A | 7/1996 | Nurmi |
| 5,604,938 A | 2/1997 | Tyler |
| 5,625,905 A | 5/1997 | Woods |
| 5,707,027 A | 1/1998 | Hiesener |
| 5,754,987 A | 5/1998 | Johansson et al. |
| 5,813,061 A | 9/1998 | Tornqist |
| 5,873,135 A | 2/1999 | Tornqvist |
| 5,909,968 A | 6/1999 | Olin et al. |
| 5,956,780 A | 9/1999 | Tyler |
| 6,085,366 A | 7/2000 | Pondelick et al. |
| 6,131,596 A | 10/2000 | Monson |
| 6,148,860 A | 11/2000 | Sigler |
| 6,152,160 A | 11/2000 | Bowden Wilcox et al. |
| 6,186,162 B1 | 2/2001 | Purvis et al. |
| 6,202,683 B1 | 3/2001 | Smith |
| 6,212,700 B1 | 4/2001 | Giesler et al. |
| 6,223,357 B1 | 5/2001 | Claas |
| 6,226,807 B1 | 5/2001 | Rozenblatt et al. |
| 6,240,575 B1 | 6/2001 | Polo Sanchez |
| 6,325,356 B1 | 12/2001 | Rozenblatt |
| 6,347,416 B1 | 2/2002 | Anderson et al. |
| 6,349,424 B1 | 2/2002 | Stradinger et al. |
| 6,349,425 B1 | 2/2002 | Stradinger et al. |
| 6,353,942 B1 | 3/2002 | Pondelick et al. |
| 6,370,709 B1 | 4/2002 | Stradinger et al. |
| 6,394,122 B1 | 5/2002 | Sibley et al. |
| 6,402,799 B1 | 6/2002 | Kokubo et al. |
| 6,453,481 B1 | 9/2002 | Pondelick et al. |
| 6,484,743 B2 | 11/2002 | Baukman |
| 6,502,278 B2 | 1/2003 | Oh et al. |
| 6,513,174 B1 | 2/2003 | Johansson |
| 6,536,054 B2 | 3/2003 | Anderson et al. |
| 6,536,055 B2 | 3/2003 | Pondelick et al. |
| 6,546,593 B2 | 4/2003 | Oh et al. |
| 6,575,425 B1 | 6/2003 | Betz |
| 6,648,002 B2 | 11/2003 | Lappalainen |
| 6,704,947 B2 | 3/2004 | Stradinger et al. |
| 6,729,368 B2 | 5/2004 | Nguyen |
| 6,732,386 B2 | 5/2004 | Anderson et al. |
| 6,748,973 B2 | 6/2004 | Lindroos |
| 6,763,531 B1 | 7/2004 | Huffman et al. |
| 6,883,188 B2 | 4/2005 | Sigler et al. |
| 6,977,005 B2 | 12/2005 | Erdmann et al. |
| 6,981,285 B2 | 1/2006 | Sigler et al. |
| 7,127,749 B2 | 10/2006 | Ling |
| 7,156,363 B2 | 1/2007 | Parsons et al. |
| 7,169,305 B2 | 1/2007 | Gomez |
| 7,188,822 B2 | 3/2007 | Marcichow et al. |
| 7,331,365 B2 | 2/2008 | Nguyen |
| 7,690,053 B2 | 4/2010 | Pondelick |
| 7,921,478 B1 | 4/2011 | Vanini |
| 8,613,115 B2 | 12/2013 | Seibt et al. |
| 8,769,731 B2 | 7/2014 | Seibt |
| 8,887,320 B2 | 11/2014 | Dezarn et al. |
| 2001/0034902 A1* | 11/2001 | Tyler .................. B61D 35/007 4/321 |
| 2002/0069459 A1* | 6/2002 | Pondelick ............... E03D 11/02 4/431 |
| 2002/0145080 A1 | 10/2002 | Renken et al. |
| 2005/0173336 A1 | 8/2005 | Arnaud |
| 2006/0075546 A1 | 4/2006 | Sigler |
| 2007/0226887 A1 | 10/2007 | Lappalainen et al. |
| 2007/0297894 A1 | 12/2007 | Dandasi et al. |
| 2010/0083433 A1 | 4/2010 | Pondelick et al. |
| 2010/0083435 A1* | 4/2010 | Hoang .................... E03F 1/006 4/431 |
| 2011/0173743 A1 | 7/2011 | Jensen et al. |
| 2014/0041109 A1 | 2/2014 | Stauber et al. |
| 2014/0101837 A1 | 4/2014 | Boodaghians et al. |
| 2014/0137319 A1 | 5/2014 | Beach et al. |
| 2014/0208498 A1 | 7/2014 | Beach et al. |
| 2014/0223655 A1 | 8/2014 | Dillard |
| 2014/0259343 A1 | 9/2014 | Wilson et al. |
| 2015/0013058 A1 | 1/2015 | Bucher et al. |

OTHER PUBLICATIONS

Non-Final Office Action on U.S. Appl. No. 15/084,185, dated Apr. 7, 2017, 14 pages.

Final Office Action for U.S. Appl. No. 15/084,185 dated Oct. 20, 2017. 12 pages.

Non-Final Office Action for U.S. Appl. No. 15/084,317 dated Sep. 27, 2017. 25 pages.

Non-Final Office Action for U.S. Appl. No. 15/084078, dated Jan. 5, 2018, 8 pages.

* cited by examiner

APPARATUS FOR CONTROLLING A TOILET SYSTEM

CROSS REFERENCES TO RELATED APPLICATIONS

The present application claims the benefit of U.S. Provisional Application No. 62/140,260, entitled "VACUUM TOILET SYSTEM AND INSTALLATION METHOD THEREOF," and filed on Mar. 30, 2015, which is incorporated herein by reference in its entirety.

FIELD OF THE DISCLOSURE

The present disclosure is relates generally to toilets and, more particularly, an apparatus for controlling a toilet system.

BACKGROUND

Designing a toilet for an aircraft poses challenges that do not generally occur in ground-based toilet designs. For example, in an aircraft, space and weight are at a premium, and using regular water-flush toilets is not practical. In addition, the toilet system must be compliant with aircraft specifications and must be configurable to interact with aircraft software platforms on different aircraft manufacturers.

DRAWINGS

While the appended claims set forth the features of the present techniques with particularity, these techniques may be best understood from the following detailed description taken in conjunction with the accompanying drawings of which:

DETAILED DESCRIPTION

Figure 1:
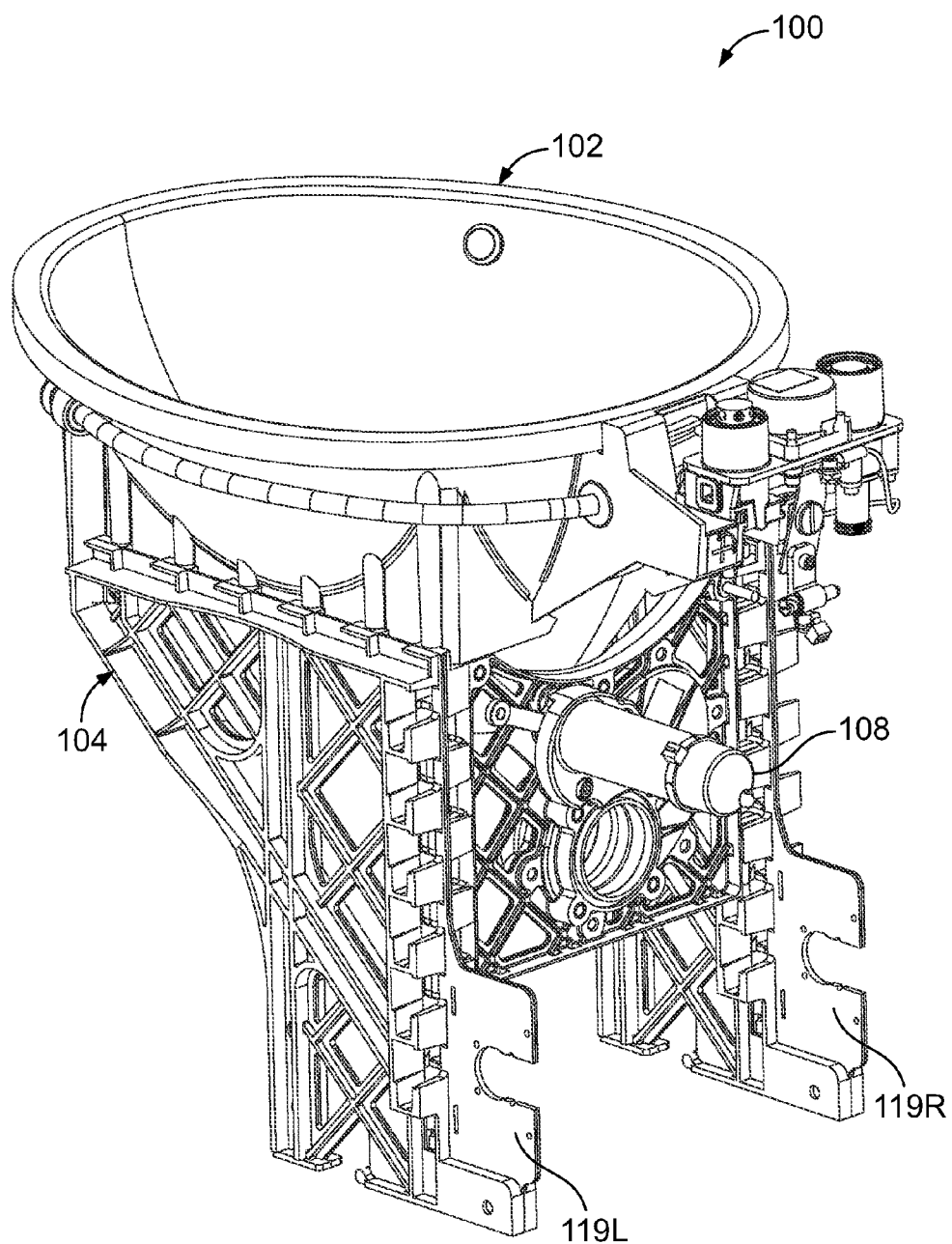
FIG. 1 is a perspective view of a toilet configured according to an embodiment.

The following discussion is directed to various exemplary embodiments. However, one possessing ordinary skill in the art will understand that the examples disclosed herein have broad application, and that the discussion of any embodiment is meant only be exemplary of that embodiment, and not intended to suggest that the scope of the disclosure, including claims, is limited to that embodiment.

Certain terms are used throughout the following description to refer to particular features or components. As one skilled in the art will appreciate, different persons may refer to the same feature or component by different names. This document does not intend to distinguish between components or features that differ in name but not function. The drawing figures are not necessarily to scale. Certain features and components herein may be shown exaggerated in scale or in somewhat schematic form and some details of conventional elements may not be shown in interest of clarity and conciseness.

The disclosure is generally directed to a toilet system for use on an aircraft. According to an embodiment, the toilet system is configured for operation on-board an aircraft and includes a toilet bowl, a left side support bracket supporting the toilet bowl, a right side support bracket supporting the toilet bowl, a control box including a first set of pins, and a harness connector configured to electrically couple the toilet to the aircraft. The harness connector includes a set of pins, where the first set of pins of the control box are configured to be connected to the set of pins included in the harness connector, and the control box is configured to determine a platform of the aircraft (e.g., which vendor's software platform is being used or which "brand" of software platform is being used) based on the presence or absence of a pin in the set of pins included in the harness connector.

The term "logic circuitry" as used herein means a circuit (a type of electronic hardware) designed to perform complex functions defined in terms of mathematical logic. Examples of logic circuitry include a microprocessor, a controller, an application-specific integrated circuit, and a field-programmable gate array.

Figure 2:
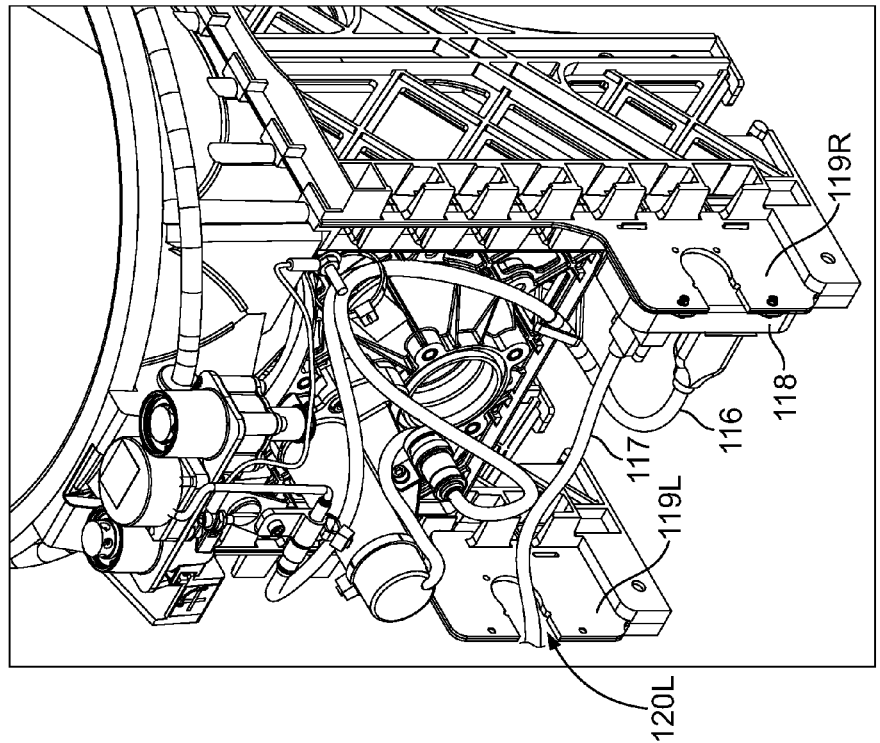
FIG. 2 is a rear view of a controller mounted on a toilet configured according to an embodiment.
Figure 3:
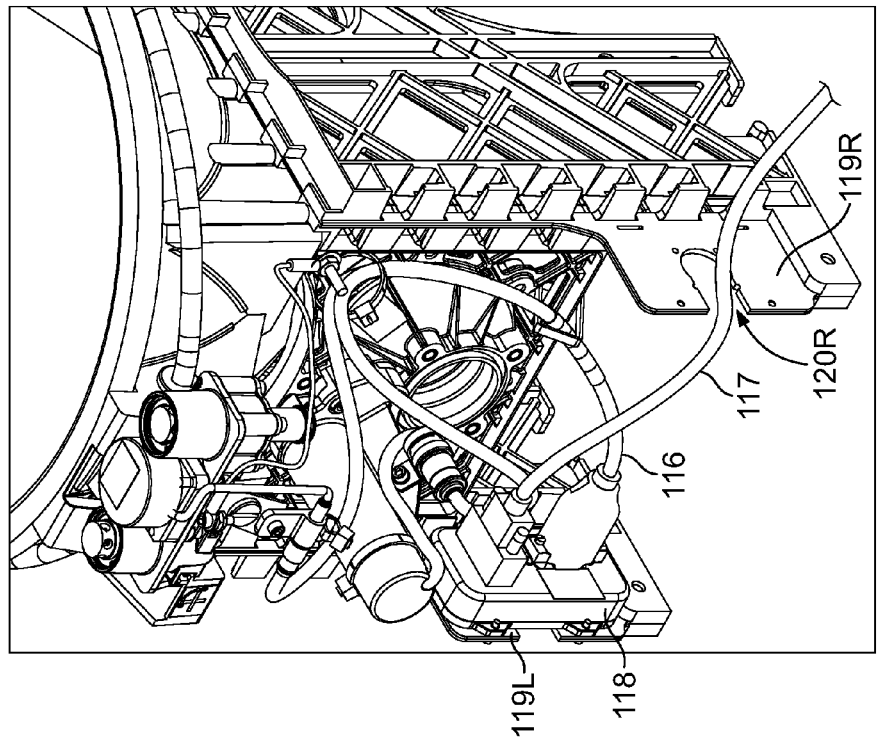
FIG. 3 is a rear view of a controller mounted on a toilet system configured according to another embodiment.

Turning to FIG. 1, a toilet configured according to an embodiment is shown. The toilet, generally labelled 100, is configured to be deployed on an aircraft, and may be housed within an external housing (not shown). The toilet 100 includes a bowl 102 attached to a frame 104. The toilet 100 also includes a motor 108 attached to the frame 104. The motor 108 drives a mechanical actuator to open or close a door to a waste outlet. The toilet 100 further includes side support brackets 119L and 119R. According to an embodiment, the left side support bracket 119L is identical to the right side support bracket 119R. One skilled in the art will understand that the left side support bracket 119L and the right side support bracket 119R may not be identical in other embodiments. According to an embodiment, the side support brackets 119L and 119R each include a respective cut-out portion 120L and 120R. FIGS. 2 and 3 show rear views of a toilet system having a control box 118 mounted on the side support brackets 119L and 119R respectively.

Turning now to FIGS. 2 and 3, the toilet 100 further includes a control box 118 attached to the frame 104. The control box 118 contains logic circuitry 502 (discussed later with reference to FIG. 5) that controls the operation of the toilet 100. FIG. 2 depicts an embodiment of the toilet 100 in which the control box 118 is mounted on the left side support bracket 119L. FIG. 3 depicts another embodiment of the toilet 100 in which the control box 118 is mounted on the right side support bracket 119R. Although depicted on the left side support bracket 119L and the right side support bracket 119R according to the embodiments above, the control box 118 may be attached to the frame 104 at other locations.

A cable 116 is attached to the control box 118 and to the motor 108. The cable 116 provides a transmission medium for electrical signals to travel from the control box 118 to the motor 108 (e.g., power and data) and for electrical signals to travel from the motor 108 to the control box 118 (e.g., data). For example, the logic circuitry in the control box 118 can transmit control signals to the motor 108 by way of the cable 116, and the motor 108 can transmit position signals to the logic circuitry by way of the cable 116. During operation, the door to the waste outlet is normally closed. When the logic circuitry in the control box 118 receives an activation signal (e.g., a signal generated by a "flush" button on the toilet 100), the logic circuitry sends a control signal to the motor 108 to open the door to the waste outlet. A pressure difference between the air in the waste pipe 106 and the air around the outside of the toilet 100 creates a suction at the waste outlet, which draws the waste from inside the bowl 102 out of the waste outlet. After a predetermined period of time, the motor 108 drives the mechanical actuator to close the door.

A cable 117 is also attached to the control box 118 and connects to the aircraft. The cable 117 provides a transmission medium for electrical signal to travel from the control box 118 to the aircraft (e.g., data) and for electrical signals to travel from the aircraft to the control box 118 (e.g., power and data). For instance, the logic circuitry in the control box 118 can transmit a flush count, total number of hours of operation of the toilet 100, and a flush valve time to open/close to enable the aircraft to perform maintenance diagnostics. According to an embodiment, the control box 118 is mounted on one of the left side support bracket 119L and the right side support bracket 119R, and the cable 117 is configured to be disposed in a respective cut out portion 119L and 119R of the other of the left side support bracket 119L and the right side support bracket 119R.

Figure 4:
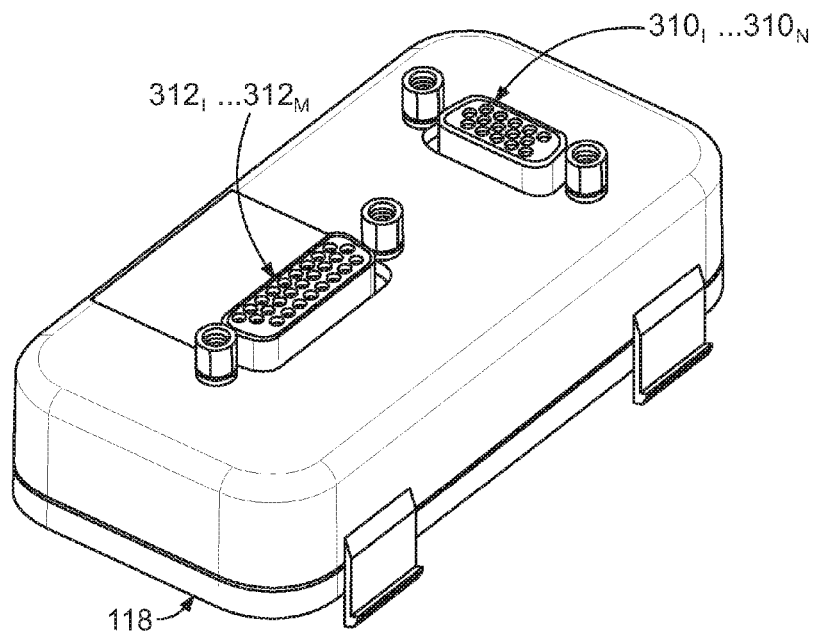
FIG. 4 is an exploded view of a controller pin configuration, according to an embodiment.

Turning to FIG. 4, in an embodiment, the control box 118 includes a casing 302, a first set of pins $310_1 \ldots 310_M$, and a second set of pins $312_1 \ldots 312_N$. In an embodiment, the casing 302 is environmentally sealed and constructed from Electromagnetic Interference (EMI) resistant engineered polymer. In an embodiment, the casing 302 is formed of a nickel-impregnated polyethyleneimine (PEI) housing to provide electromagnetic compatibility mitigation.

During operation, the pins first set of pins 310 1 . . . 310 M are connected to the aircraft via a harness connector 510 and the second set of pins $312_1 \ldots 312_N$ are connected to the motor 108. In an embodiment, the control box 118 determines the aircraft specifications based on the presence or absence of a particular pin in the harness connector 510 connecting the control box 118 to the aircraft.

For instance, in an embodiment, the control box 118 includes a first set of pins $310_1 \ldots 310_M$, where M=10. If for example, the harness connector 510 includes 10 pins that correspond to the first set of pins $310_1 \ldots 310_{10}$ in the control box 118, the control box 118 may receive aircraft configuration information via the harness connector 510 and determine that the aircraft includes a software platform of a first aircraft manufacturer and operate the toilet 100 accordingly. If, for example in another embodiment, the harness connector 510 includes 9 pins that correspond to the first set of pins $310_1 \ldots 310_9$ in the control box 118, the control box 118 may receive aircraft configuration information via the harness connector 510 and determine that the aircraft includes a software platform of a second aircraft manufacturer and operate the toilet 100 accordingly. Of course, a person skilled in the art will understand that any number of pins may be provided in the first set of pins $310_1 \ldots 310_M$ of the control box 118. Moreover, a person skilled in the art will understand that the harness connector 510 may include any number of pins as determined by the configuration information of the respective aircraft platform and is not limited to the example discussed above.

Figure 5:
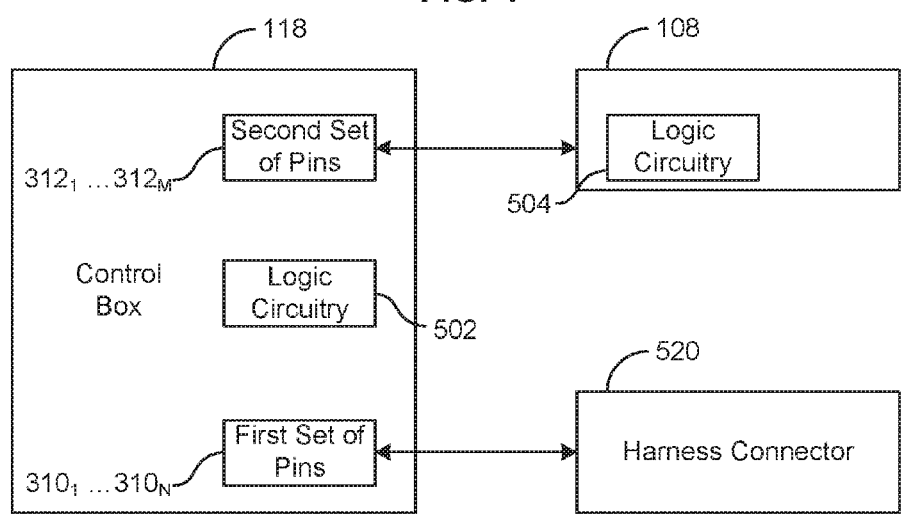
FIG. 5 is a block diagram depicting logic circuitry that may be used in an embodiment.

Turning to FIG. 5, in an embodiment, the control box 118 includes logic circuitry 502 that generally controls the operation of the toilet 100. The logic circuitry 502 of the control box 118 is configured to determine the platform of the aircraft on which the toilet 100 is installed based on the pin configuration of the first set of pins $310_1 \ldots 310_M$. The control box 118 is configured to provide a transmission medium for electrical signal to travel from the toilet 100 to the aircraft (e.g., data) and for electrical signals to travel from the aircraft to the toilet 100 (e.g., power and data). For instance, the logic circuitry 502 in the control box 118 can transmit a flush count, total number of hours of operation of the toilet 100, and a flush valve time to open/close to enable the aircraft to perform maintenance diagnostics. One skilled in the art will understand that additional information may be shared between the toilet 100 and the aircraft via the control box 118. For instance, in an exemplary implementation, the control box 118 may communicate any failure issues (e.g., clogs, power loss, motor failure, etc.) to the aircraft.

By way of example, in an embodiment, the motor 108 includes logic circuitry that controls the operation of the motor 108. The logic circuitry 502 communicates with logic circuitry 504 of the motor 108. In an embodiment, when the logic circuitry 502 of the toilet 100 carries out a start-up operation (e.g., upon power-up of the toilet 100), the logic circuitry 502 transmits, to the logic circuitry 504 of the motor 108, a command to put the motor 108 in a zero position. In order to reach the zero position, the logic circuitry 504 causes the rotor 206 to rotate in the appropriate direction and for the appropriate number of revolutions in order to move the door 302 to a predetermined position, such as fully open or fully closed.

A feature of the control box 118 in accordance with the embodiments discussed above is that a common circuit board hardware and software (implementing logic circuitry 502) may be used in conjunction with platforms of various aircraft manufacturers. Additional features of the control box 118 in accordance with the embodiments discussed above will be readily apparent to one skilled in the art.

For the purposes of promoting an understanding of the principles of the disclosure, reference has been made to the embodiments illustrated in the drawings, and specific language has been used to describe these embodiments. However, no limitation of the scope of the disclosure is intended by this specific language, and the disclosure should be construed to encompass all embodiments that would normally occur to one of ordinary skill in the art.

The particular implementations shown and described herein are illustrative examples and are not intended to otherwise limit the scope of the disclosure in any way. For the sake of brevity, conventional electronics, control systems, software development and other functional aspects of the systems (and components of the individual operating components of the systems) may not be described in detail.

The steps of all methods described herein are performable in any suitable order unless otherwise indicated herein or otherwise clearly contradicted by context. The use of any and all examples, or exemplary language (e.g., "such as") provided herein, is intended merely to better illuminate the disclosure and does not pose a limitation on scope unless otherwise claimed. Numerous modifications and adaptations will be readily apparent to those skilled in this art without departing from the spirit and scope of the disclosure.

It will also be recognized that the terms "comprises," "comprising," "includes," "including," "has," and "having," as used herein, are specifically intended to be read as open-ended terms of art. The use of the terms "a" and "an" and "the" and similar referents in the context of describing the invention (especially in the context of the following claims) are to be construed to cover both the singular and the plural, unless the context clearly indicates otherwise. In addition, it should be understood that although the terms "first," "second," etc. may be used herein to describe various elements, these elements should not be limited by these terms, which are only used to distinguish one element from another.

We claim:

1. A toilet system configured for operation on-board an aircraft comprising:
a toilet bowl;
a left side support bracket supporting the toilet bowl;
a right side support bracket supporting the toilet bowl;
a control box including a first set of pins; and
a harness connector configured to electrically couple the toilet system to the aircraft, the harness connector including a set of pins; wherein
the first set of pins of the control box are configured to be connected to the set of pins included in the harness connector; and
the control box is configured to determine a platform of the aircraft based on presence or absence of a pin in the set of pins included in the harness connector.

2. The toilet system according to claim 1, wherein the left side support bracket and the right side support bracket each contain a respective cut out portion.

3. The toilet system according to claim 2, wherein
the control box is mounted on one of the left side support bracket and the right side support bracket, and
the harness connector is disposed within the cut out portion of the other of the left side support bracket and the right side support bracket.

4. The toilet system according to claim 1, further comprising
a motor configured to control a door to a waste outlet of the toilet bowl; wherein
the control box includes a second set of pins configured to electrically control the motor via a cable.

5. The toilet system according to claim 2, wherein the left side support bracket is identical to the right side support bracket.

6. The toilet system according to claim 1, wherein the control box is configured to transmit at least one of a flush count, a total number of operational hours, and flush valve time to open/close, to the aircraft via the harness connector.

7. The toilet system according to claim 1, wherein the control box is disposed in a casing.

8. The toilet system according to claim 7, wherein the casing is formed of an electromagnetic interference resistant engineered polymer.

9. The toilet system according to claim 7, wherein the casing is formed of a nickel-impregnated polyethyleneimine (PEI) housing.

10. The toilet system according to claim 1, wherein the control box is configured to provide at least one of diagnostic and fault information to the aircraft.

11. The toilet system according to claim 3, wherein the control box is mounted on one of the left side support bracket and the right side support bracket via a plurality of screws.

* * * * *